United States Patent
Nelson

(10) Patent No.: US 6,293,299 B1
(45) Date of Patent: Sep. 25, 2001

(54) TEMPERATURE AND FLOW LIMITING DEVICE

(75) Inventor: Alfred C. Nelson, Carmel, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 0 days.

(21) Appl. No.: 09/368,999

(22) Filed: Aug. 5, 1999

(51) Int. Cl.[7] .................................................. F16K 11/087
(52) U.S. Cl. ................ 137/269; 137/625.17; 137/625.41
(58) Field of Search .......................... 137/625.41, 625.17, 137/625.4, 269

(56) References Cited

U.S. PATENT DOCUMENTS

| | | | |
|---|---|---|---|
| 3,915,195 | * 10/1975 | Manoogian et al. | 137/625.41 |
| 4,043,359 | 8/1977 | Christo . | |
| 4,089,347 | 5/1978 | Christo . | |
| 4,576,202 | * 3/1986 | Knapp | 137/625.17 |
| 4,672,999 | * 6/1987 | Knapp | 137/625.4 |
| 4,821,765 | 4/1989 | Iqbal et al. . | |
| 4,901,750 | 2/1990 | Nicklas et al. . | |
| 4,981,156 | 1/1991 | Nicklas et al. . | |
| 5,469,889 | 11/1995 | Tang . | |
| 5,477,885 | 12/1995 | Knapp . | |
| 5,810,050 | 9/1998 | Pickerrell et al. . | |
| 5,853,023 | * 12/1998 | Orlandi et al. | 137/271 |

\* cited by examiner

Primary Examiner—Michael Powell Buiz
Assistant Examiner—Ramesh Krishnamurthy
(74) Attorney, Agent, or Firm—Myron B. Kapustij; Lloyd D. Doigan

(57) ABSTRACT

A limiting device for use with a single-handle valve for mixing hot and cold water and for controlling the maximum flow-volume or the maximum temperature of flow through the valve. The device limits the range of motion of the control stem of a single-handle mixing valve. The device comprises a guide template and an insert. The guide template generally defines the range of motion of the control stem, the control stem being positioned within a camming aperture of the guide template, the camming aperture having the same general shape as the range of motion of the control stem. The guide template includes a guide-cover key that prevents any rotary movement of the guide template relative to the single-handle mixing valve, and a guide-insert key. The insert further limits the range of motion of the control stem during engagement with the guide template. The insert includes an insert-limiting edge that further reduces the size of the camming aperture during engagement of the insert with the guide template. The insert also includes an insert-cam key. The insert-cam key and the guide-insert key cooperatively retain the insert relative to the guide template during engagement of the insert and the guide template. The insert can be replaced with either an insert having a similar control edge or with an insert having a different control edge to control the maximum flow-volume and temperature through the valve.

15 Claims, 2 Drawing Sheets

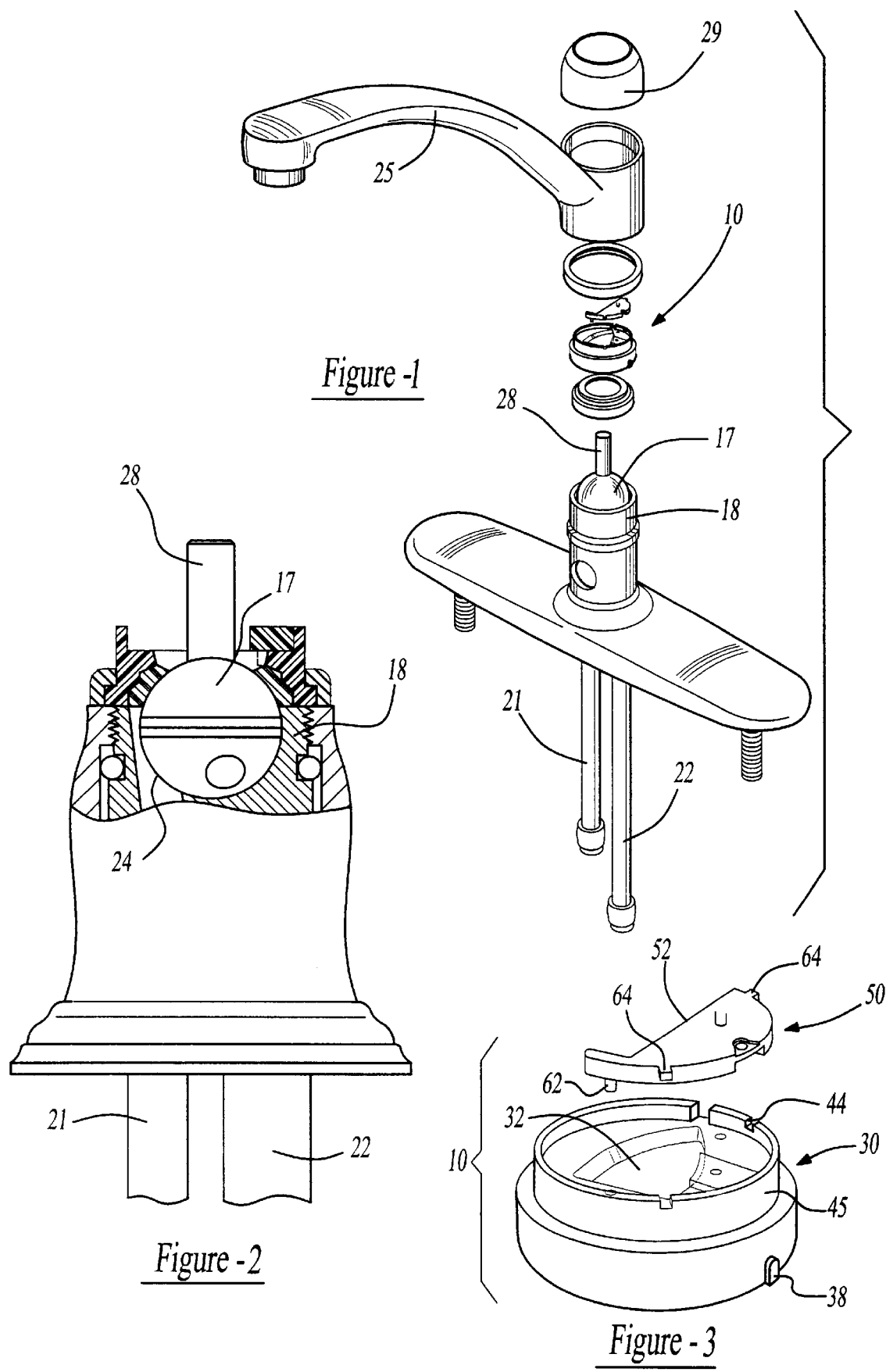

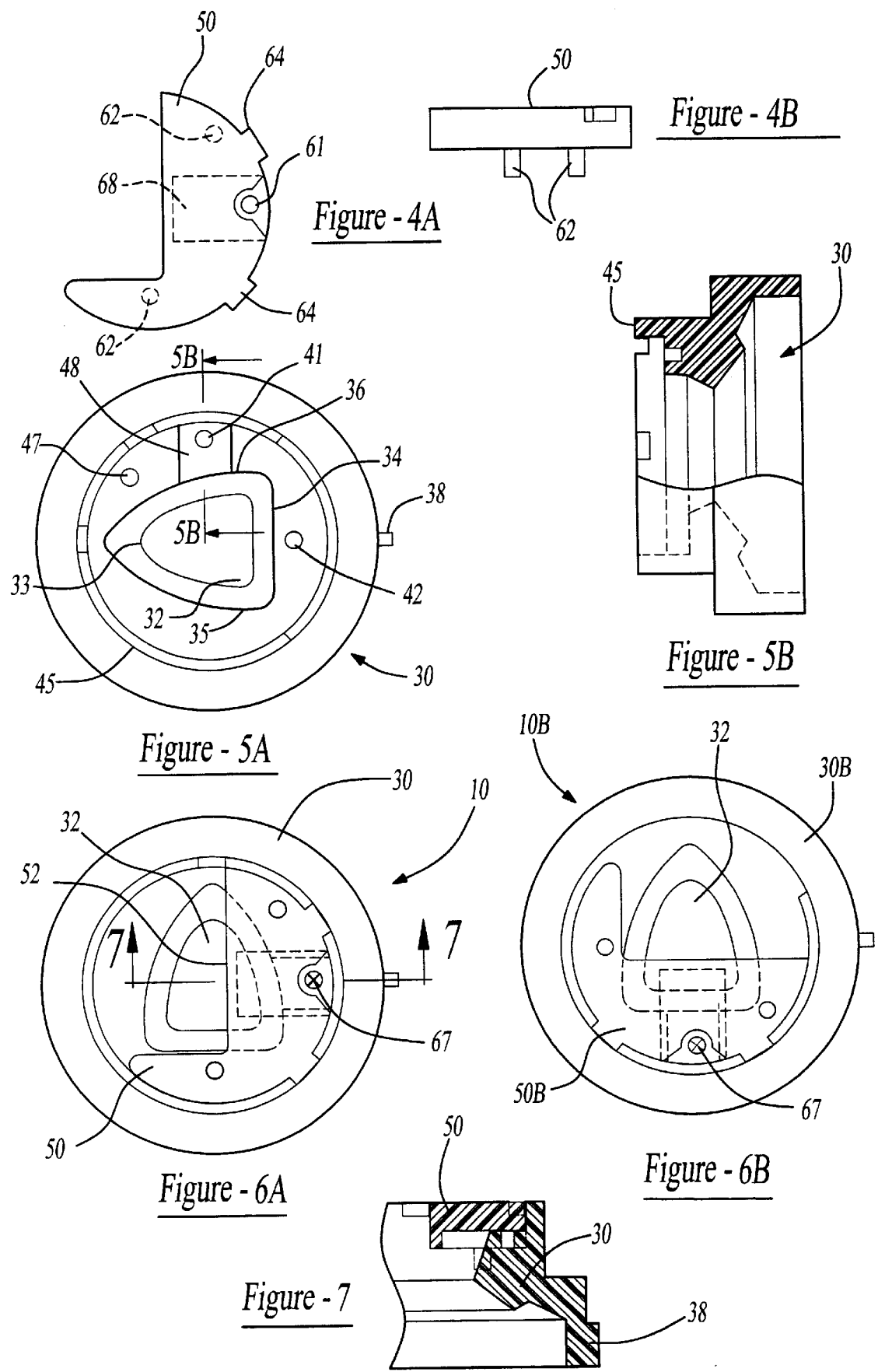

TEMPERATURE AND FLOW LIMITING DEVICE

FIELD OF USE

The invention relates to a single-handle mixing valve, and more particularly, a limiting device for use with the single-handle mixing valve for controlling the maximum flow-volume and/or the maximum temperature of water flowing through the valve.

BACKGROUND OF THE INVENTION

Single-handle mixing valves have become commonplace. However, many compromises have been built into mixing valves to accommodate high flow-volumes and easy temperature control. Also, while limiting devices have been used, they are generally complicated mechanisms that cannot be easily repaired or replaced.

Since water ignition systems control many home water heaters, water is quickly heated to the selected temperature when the water outlet is opened. A normal home water heater can heat water to more than 150° F., whereas optimum water temperature for washing and bathing is maintained between 95° F. and 104° F. Scalding occurs at about 115° F. Accordingly, it is practical to limit the maximum water temperature. Also, with the changes of seasons and changes in settings of the water heater, the water temperature being dispensed varies.

Anti-scald configurations are known for shower handles where a single handle controls the full range of water temperatures. The handle generally moves through a wide range of motion so that the person taking the shower can make minor adjustments without risking being exposed to severe temperature changes. By limiting the range of motion of these handles, scalding temperatures are avoided. Similarly, in single-handle modular cartridge valves, an insert interposed between the operating stem and the temperature control knob orientates the knob with respect to the valve housing.

The single-handle mixing valve generally has a control stem extending out from the valve housing and connectable to a control stem to control the position of the valve. The range of motion of flow-volume and water temperature is defined by the shape of the opening in the guide template. The internal position of the volume and temperature limiting devices renders them difficult to change. In addition, repair or replacement of the limit structures requires that the main water line be shut off from the valve.

The primary problem still remaining is to adjust the maximum water output and to suitably limit the temperature of the mixed water when the valve is fully opened. Such a possibility appears desirable for a more efficient use of mixing valves by preventing an unnecessary waste of water and, in particular, of hot water in order to prevent scalding and to achieve a substantial saving of energy.

What is needed is a single-handle mixing valve having a valve housing that prevents excessively high water temperatures and flow-volumes; that includes means for retaining interchangeable cams as part of the valve housing, each cam either having or not having maximum flow-volume and temperature stops enabling the ready replacement of the cam without the need to disassemble the valve housing, that is simple in structure, durable in use, and economical to make.

What is needed is an easily assembled limiting device for use with a single-handle mixing valve which provides full adjustment of the flow-volume and temperature in a cartridge-type configuration that can be readily adjusted for varying maximum flow-volume and/or maximum temperature; that can be applied to the exterior of the valve housing; that has valve mechanisms housed in a cartridge that can be easily replaced when necessary; and that is independent of the guide mechanism to enable easy replacement of limiting elements for changing the maximum flow-volume and temperature profile of the mixing valve without disassembly of the valve housing.

What is needed is a limiting device for an improved single-lever flow-control valve which has a long service life and that can be varied in the field either during installation or servicing without any special tools simply be either adding an insert to a guide template or by replacing an insert with another insert having a different controlling edge.

SUMMARY

It is the primary objective of the present invention to provide a device that can be easily changed without disassembly of the valve housing that will enable (1) conventional maximum water temperature and conventional maximum flow-volume of water; (2) limited maximum temperature and conventional maximum flow-volume of water; (3) conventional maximum water temperature and limited maximum flow-volume of water; and (4) limited maximum water temperature and limited maximum flow-volume of water, the limits being readily adjustable and easily changed either installation or during servicing, with no special tools.

It is another objective to provide a simple and economical means to limit the repositioning of the control stem in a first direction to limit maximum water temperature, in a second direction to limit maximum flow-volume, and in a combination of the two directions to limit both maximum water temperature and maximum flow-volume of the mixed water.

These problems and objectives are addressed by the limiting device of the present invention. While one skilled in the art will readily understand that the principles of the present invention are applicable to a wide range of single-handle mixing valves, including flat plate valves, for purposes of illustration reference is made hereinafter to a ball valve.

A conventional ball-type single-handle mixing valve includes a valve body having a pair of inlet ports for hot and cold water, respectively, in fluid communication to an outlet port. A control stem extends outwardly from the valve body and is connected to the valve member for unitary movement with the valve member. The ball valve is pivotably mounted in a valve housing. The housing has a plurality of ports in fluid communication with the cavity and the ball valve has a plurality of openings in an outer spherical valve surface. The openings cooperate with the ports to control water flow through the ports. When the control stem is raised, the output port of the mixing valve is opened. The inlet ports become aligned with at least one of the openings. When the control stem abuts the forward edge of the camming aperture, the inlet ports in the housing and the openings in the ball element are aligned to allow maximum flow.

The limiting device of the present invention is for use with the single-handle mixing valve for limiting the maximum water flow-volume or the maximum water temperature through the valve. The device that limits the range of motion of the control stem of a single-handle mixing valve, and comprises a guide template and an insert.

The guide template generally defines the range of motion of the control stem, the control stem being positioned within the camming aperture. The position of the control stem determines the flow-volume and temperature of water flowing into the outlet port. The control stem extends from the valve chamber through a camming aperture in the guide template. The camming aperture has a shape that is generally the same as the range of motion of the control stem, such that the shape of the camming aperture defines the maximum flow-volume and temperature of the valve. The camming aperture design is configured to limit the range of motion of the control stem and prevent scalding water and excessive flow-volumes from passing through the outlet port. The guide template includes a guide-cover key that prevents any rotary movement of the guide template relative to the single-handle mixing valve, and a guide-insert key.

The insert further limits the range of motion of the control stem during engagement of the insert with the guide template. The insert includes an insert-limiting edge, that reduces the size of the camming aperture during engagement of the insert with the guide template. The insert also includes an insert-cam key that operates in conjunction with the guide-insert key to retain the insert relative to the guide template during engagement of the insert and the guide template.

For a more complete understanding of the limiting device of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE DRAWINGS

FIG. 1 discloses an assembly view of a single-handle mixing valve including a first preferred embodiment of the limiting device of the present invention, the device limiting the temperature of hot water flowing through the valve;

FIG. 2 discloses a front half-sectional view of the single-handle mixing valve of FIG. 1;

FIG. 3 discloses an exploded assembly view of the limiting device for the preferred embodiment of FIG. 1, the device limiting the flow of high temperature water through the valve, and comprising a guide template and an insert;

FIG. 4A discloses a detailed top view of the insert of FIG. 3; and

FIG. 4B discloses a detailed front view of the insert of FIG. 4A;

FIG. 5A discloses a detailed top view of the guide template of FIG. 3;

FIG. 5B discloses a detailed partial-sectional end view taken through Section 5B—5B of FIG. 5A;

FIG. 6A discloses a top view of the first preferred embodiment of the assembled guide template and insert of the limiting device of FIG. 3;

FIG. 6B discloses a top view of a second preferred embodiment of the assembled guide template and insert of the limiting device of the present invention, the device limiting the flow-volume through a single-handle mixing valve; and FIG. 7 discloses a partial section end view of the first preferred embodiment of the limiting device of the present invention, the view being taken through line 7—7 of FIG. 6A.

DETAILED DESCRIPTION OF THE PREFERRED EMBODIMENTS

The limiting device 10 of the present invention is for use with a single-handle mixing valve 16 and limits the maximum water flow-volume or the maximum water temperature through the mixing valve 16. Referring now to the drawings, as been seen in FIG. 6A, the limiting device 10 of the present invention limits the range of motion of the control stem of a single-handle mixing valve 16. The limiting device 10 comprises a guide template 30, an insert 50 and means to secure the insert 50 within the guide template 30. The device 10 is used to limit maximum water temperature and/or maximum flow-volume through the single-handle mixing valve 16.

In one embodiment as shown in FIGS. 1 and 2, a ball-type single-handle mixing valve 16 is used with a first preferred embodiment of the limiting device 10 of the present invention. The mixing valve 16 blends amounts of hot and cold water. The mixing valve 16 comprises a valve housing 18, hot and cold water inlet ports 21 and 22 disposed in the valve housing 18, a mixing valve chamber 24, an outlet port 25, a control stem 28 extending from the valve chamber 24 through a camming aperture 32 in a guide template 30 disposed in the valve housing 18 and a cover 29. The single-handle mixing valve 16 has a ball valve 17 pivotably mounted in a valve housing 18. The ball valve 17 includes a plurality of ports (not shown) in fluid communication with the cavity and the ball valve 17 has a plurality of openings in an outer spherical valve surface. The openings cooperate with the inlet ports to control water flow through the outlet port 25. The limiting device 10 of the present invention is positioned onto the exterior of the valve housing 18 and defines the range of motion of the control stem 28.

While the limiting device 10 of the present invention can be adapted for use in essentially any shape camming aperture 32 including arcuate and circular, for purposes of illustration, the configuration of the camming aperture 32 has the general shape of a triangle (see FIG. 3). The rear position is an apex 33 of the camming aperture 32 that defines the "no flow" position through the mixing valve 16. The forward edge 34 of the camming aperture 32 defines all positions of maximum flow-volume. Flow-volume is the greatest when the control stem 28 abuts the forward edge 34. The right side-edge 35 of the camming aperture 32 defines all positions of minimum water temperature and the left side-edge 36 defines all positions of maximum water temperature.

A plane passing through the apex 33 and the outlet port 25 intersects the forward edge 34 at a fully-raised stem position. The intersection of the plane through the camming aperture 32 defines a cold temperature zone and a hot temperature zone. The water is the hottest when the control stem 28 abuts the left side-edge 36, and the water is the coldest when the control stem 28 abuts the right side-edge 35.

The forward edge 34 has a full-flow-blended position when the amount of hot water passing through the single-handle mixing valve 16 is essentially equal to the amount of cold water passing through the mixing valve 16. An imaginary flow axis connects the apex 33 with the full-flow-blended position. The flow axis divides the camming aperture 32 into a colder zone and a hotter zone. The colder zone is essentially the same size and shape as the hotter zone.

Attention is now drawn to the guide template 30 as shown in FIGS. 5A and 5B. The guide template 30 includes a camming aperture 32 having the same general shape as the range of motion of the control stem 28. The control stem 28 is positioned within the camming aperture 32 when the guide template 30 is cooperatively engaging onto the single-handle mixing valve 16. As shown, the guide template 30 is a cartridge having a generally cylindrical shape. A raised rim 45 is disposed about the perimeter of the outer surface 34 of the guide template 30. The guide template 30 further includes a guide cover key 38, preferably disposed on the outer surface of the guide template 30. The key 38 prevents any rotary movement of the guide template 30 relative to the single-handle mixing valve 16.

Attention is next drawn to the insert 50 as shown in FIGS. 4A and 4B. The insert 50 nests within the guide template 30 and further limits the range of motion of the control stem 28. The insert 50 has a limiting edge 52 that truncates the left side-edge 36 of the camming aperture 32 during engagement. This limits the hot water flow through the single-handle mixing valve 16 making the colder zone larger than the hotter zone. The limiting edge 52 may be either linear (as shown) or arcuate, may have differing widths, and may even form any appropriate angle with perimeter of the guide template 30 as necessary based upon predetermined calculations as to the desired flow profile.

In the preferred embodiments of the limiting device 10 of the present invention, FIGS. 3, 4A, 4B, 5A, 5B, 6A, 6B, and 7 disclose a combination of means for securely retaining the insert 50 within the guide template 30 to prevent any movement of the insert 50 relative to the guide template 30. The first retaining means is a pair of plugs 62 disposed at distal ends of the undersurface of the insert 50 that nest within a pair of openings 42 disposed into the top surface of the guide template 30 during engagement. The plugs 62 are integral to the insert 50. A second retaining means comprises a pair of notches 44 disposed on the top perimeter of the raised rim 45 of the guide template 30. A pair of ribs 64 are integral with the insert 50 and extend outward from the side surface. The pair of ribs 64 nest within the pair of notches 44 during engagement. A third retaining means is a raised square-shaped portion 48 on the top surface of the guide template 30 that nests with a square-shaped mating recess 68 in the undersurface of the insert 50. And finally, a fourth retaining means is any conventional fastener 67, such as a metal screw, that is inserted into a hole 41 disposed in the square-shaped portion of the guide template 30 and a hole 61 disposed on the mating recess of the insert 50. The retaining means can also be any chemical adhesive, epoxy, glue, paste, or the like. However, mechanical means are preferred to enable easy replacement of the insert 50 apart from the guide template 30.

FIG. 6B discloses a top view of another preferred embodiment of the limiting device 10B of the present invention. The limiting device 10B comprises a guide template 30, an insert 50, and means 70 to secure the insert 50 within the guide template 30. However, in this configuration, the limiting device 10 limits the maximum flow-volume through the single-handle mixing valve 16. This embodiment is particularly useful in areas where the supply of water is limited. The principles of the present invention are also applicable to guide templates 30 and inserts 50 designed to limit both maximum water temperature and maximum flow-volumes.

The limiting device 10 of the present invention has a long service life that can be varied in the field either during installation or servicing without any special tools simply be either adding an insert 50 to a guide template 30 or by replacing an insert 50 with another insert 50 having a different controlling edge 52. The material used in the limiting device 10 of the present invention has sufficient strength so as not to deform or otherwise fail during usage. While a number of plastic materials can be used, the material of choice is "celcon M90" from the Celanese Corporation—a member of the Hoechst Group.

The water temperature at the faucet will vary with changes in the supply temperatures of the hot and cold water. Accordingly, with any dramatic changes in the environmental temperature or changes in the settings of the water heater, different cams with different camming aperture $32s$ are needed. Adjustment of the maximum temperature mix and or the maximum flow-volume is accomplished by replacing the insert 50 with another having different limiting edge 52. The insert 50 is independent of the guide template 30 to enable easy replacement without removal of the guide template 30 and without shutting off the water supply to the mixing valve 16. The insert 50 can be replaced with either an insert 50 having a similar control edge 52 or with an insert 50 having a different control edge 52 to redefine the maximum flow-volume and temperature profiles.

It is evident that many alternatives, modifications, and variations of the limiting device 10 of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed:

1. A device for limiting range of motion of a control stem of a single-handle mixing valve, the device comprising:
    (a) a guide template that defines the range of motion of the control stem, the guide template including;
        (i) a camming aperture disposed in the guide template, the camming aperture having a same general shape as the range of motion of the control stem, the control stem being positioned within the camming aperture when the guide template is cooperatively engaging onto the single-handle mixing valve, and
        (ii) a guide-cover key, the guide-cover key being integral to the guide template, the guide-cover key preventing any rotary movement of the guide template relative to the single-handle mixing valve,
    (b) an insert that further limits the range of motion of the control stem during engagement of the insert with the guide template, the insert including an insert-limiting edge, the insert-limiting edge reducing the size of the camming aperture during engagement of the insert with the guide template and reducing the flow volume through the single handle mixing valve during engagement of the insert and guide template with the single handle mixing valve; and
    (c) means for securely retaining the insert within the guide template to prevent any relative movement of the insert relative to the guide template.

2. The device of claim 1, wherein the retaining means comprises a notch that is integral to the guide template.

3. The device of claim 1, wherein the retaining means comprises a rib that is integral to the insert.

4. The device of claim 1, wherein the retaining means comprises the cooperative engagement between a notch that is integral to the guide template and a rib that is integral to the insert.

5. The device of claim 1, wherein the camming aperture includes an apex, a forward edge, and two side-edges, the apex defining a no-flow condition, the forward edge defining a maximum flow-volume through the single-handle mixing valve, maximum flow passing through the single-handle mixing valve when the control stem abuts the forward edge, the first side-edge defining maximum temperature through the single-handle mixing valve, the hottest temperature being when the control stem abuts the first side-edge, the second side-edge defining minimum temperature through the single-handle mixing valve, the coldest temperature being when the control stem abuts the second side-edge.

6. The device of claim 1, wherein the forward edge has a full-flow-blended position when the amount of hot liquid passing through the single-handle mixing valve is essentially equal to the amount of cold liquid passing through the mixing valve, a flow axis connecting the apex with the full-flow-blended position, the flow axis dividing the camming aperture into a colder zone and a hotter zone, the colder zone being essentially the same size as the hotter zone, the limiting edge of the insert truncating the hotter zone.

7. The device of claim 1, further comprising a fastener that secures the insert to the guide template to ensure secure retention of the insert during engagement.

8. The device of claim 1, further comprising a rib for cooperative engagement with a notch, the rib being integral with the insert and the notch being integral with the guide template.

9. A device for limiting the range of motion of a control stem of a single handle mixing valve, the device comprising:
  (a) a guide template that defines the range of motion of the control stem, the guide template including;
    (i) a camming aperture disposed in the guide template, the camming aperture having the same general shape as the range of motion of the control stem, the control stem being positioned within the camming aperture when the guide template is cooperatively engaging onto the single handle mixing valve;
    (ii) a guide-cover key, the guide-cover key being integral to the guide template, the guide-cover key preventing any rotary movement of the guide template relative to the single-handle mixing valve; and
    (iii) a raised rim integral to the guide template, the raised rim including at least one notch;
  (b) an insert that further limits the range of motion of the control stem during engagement of the insert with the guide template, the insert including an insert-limiting edge, the insert-limiting edge reducing the size of the camming aperture during engagement of the insert with the guide template; and
  (c) means for retaining the insert within the guide template to prevent any relative movement of the insert relative to the guide template comprising at least one rib integral with the insert, one rib nesting into one notch during cooperative engagement between the insert and the guide template preventing rotary movement of the insert relative to the guide template.

10. A guide template that defines a range of motion of a control stem in a single-handle mixing valve when the guide template is secured to the single-handle mixing valve, the guide template receiving an insert therein and comprising:
  (a) a camming aperture disposed in the guide template, the camming aperture having a same general shape as the range of motion of the control stem, the control stem being positionable within the camming aperture when the guide template is secured to the single-handle mixing valve;
  (b) means for integrating the guide template into the cover of the single-handle mixing valve, the integrating means preventing any rotary movement of the guide template relative to the single-handle mixing valve;
  (c) the insert having a limiting edge that reduces the size of a camming aperture during engagement of the insert with the single-handle mixing valve; and
  (d) a raised rim integral to the guide template, the raised rim including a notch, the notch receiving a rib disposed on the insert, the rib nesting into the notch during cooperative engagement between the insert and the guide template preventing rotary movement of the insert relative to the guide template.

11. The guide template of claim 10, wherein the camming aperture includes an apex, a forward edge, and two side-edges, the apex defining a no-flow condition, the forward edge defining a maximum flow-volume through the single-handle mixing valve, maximum flow passing through the single-handle mixing valve when the control stem abuts the forward edge, the first side-edge defining maximum temperature through the single-handle mixing valve, the hottest temperature being when the control stem abuts the first side-edge, the second side-edge defining minimum temperature through the single-handle mixing valve, the coldest temperature being when the control stem abuts the second side-edge.

12. The guide template of claim 10, further comprising at least one lip, the at least one lip being disposed on the insert, one lip nesting into one notch during cooperative engagement between the insert and the guide template preventing rotary movement of the insert relative to the guide template.

13. An insert that fits within a guide template and limits a range of motion of a control stem, the control stem being positionable within a camming aperture in the guide template, the camming aperture being disposed upon a guide template of a single-handle mixing valve, the insert comprising:
  (a) means enabling secure retention of the insert relative to the guide template during engagement of the insert with the guide template, said means comprising the guide template having a raised rim integral therewith, the raised rim including at least one notch, and the insert having at least one lip, the lip nesting into said at least one notch during cooperative engagement between the insert and the guide template preventing rotary movement of the insert relative to the guide template; and
  (b) an insert-limiting edge, the insert-limiting edge reducing the size of a camming aperture during engagement of the insert with the surface of the single-handle mixing valve.

14. The insert of claim 13, wherein the camming aperture includes an apex, a forward edge, and two side-edges, the apex defining a no-flow condition, the forward edge defining a maximum flow-volume through the single-handle mixing valve, maximum flow passing through the single-handle mixing valve when the control stem abuts the forward edge, the first side-edge defining maximum temperature through the single-handle mixing valve, the hottest temperature being when the control stem abuts the first side-edge, the second side-edge defining minimum temperature through the single-handle mixing valve, the coldest temperature being when the control stem abuts the second side-edge, distance between the apex and the insert-limiting edge being less than the a distance between the apex and the forward edge during cooperative engagement between the insert and the surface of the single-handle mixing valve.

15. The insert of claim 13, wherein the camming aperture includes an apex, a forward edge, and two side-edges, the apex defining a no-flow condition, the forward edge defining a maximum flow-volume through the single-handle mixing valve, maximum flow passing through the single-handle mixing valve when the control stem abuts the forward edge, the first side-edge defining maximum temperature through the single-handle mixing valve, the hottest temperature being when the control stem abuts the first side-edge, the second side-edge defining minimum temperature through the single-handle mixing valve, the coldest temperature being when the control stem abuts the second side-edge, the distance between the insert-limiting edge and the second side edge being less than the distance between the first-side edge and the second side-edge during cooperative engagement between the insert and the surface of the single-handle mixing valve.

* * * * *